United States Patent
Telukunta et al.

(10) Patent No.: US 11,951,847 B2
(45) Date of Patent: Apr. 9, 2024

(54) LIGHTWEIGHT BATTERY BOX FOR ELECTRIC VEHICLES

(71) Applicant: Ford Global Technologies, LLC, Dearborn, MI (US)

(72) Inventors: Rohit Telukunta, Troy, MI (US); Steven Frank, Dearborn, MI (US); Adam Weyrauch, Canton, MI (US); Michael J. Gardynik, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 160 days.

(21) Appl. No.: 17/363,545

(22) Filed: Jun. 30, 2021

(65) Prior Publication Data

US 2023/0001801 A1   Jan. 5, 2023

(51) Int. Cl.
   *B60K 1/04* (2019.01)
   *B60L 50/60* (2019.01)
   *B62D 21/15* (2006.01)
   *B62D 29/00* (2006.01)

(52) U.S. Cl.
   CPC .............. *B60L 50/66* (2019.02); *B60K 1/04* (2013.01); *B62D 21/15* (2013.01); *B62D 29/008* (2013.01); *B60K 2001/0438* (2013.01); *B60Y 2306/01* (2013.01)

(58) Field of Classification Search
   CPC ... B60L 50/66; B60K 1/04; B60K 2001/0438; B62D 21/15; B62D 29/008; B60Y 2306/01
   See application file for complete search history.

(56) References Cited

U.S. PATENT DOCUMENTS

| 10,886,513 | B2* | 1/2021 | Stephens | H01M 50/224 |
| 2016/0023689 | A1* | 1/2016 | Berger | B60L 50/66 |
| | | | | 180/65.23 |
| 2020/0010933 | A1 | 1/2020 | Beals | |
| 2020/0350522 | A1* | 11/2020 | Choi | H01M 10/66 |

FOREIGN PATENT DOCUMENTS

| CN | 202712288 | 1/2013 |
| CN | 210403831 | 4/2020 |
| JP | 2020191165 | 11/2020 |
| WO | 2020193426 | 10/2020 |
| WO | 2020214750 | 10/2020 |
| WO | 2021050674 | 3/2021 |

OTHER PUBLICATIONS

Magna Cosma International, Aluminum High Pressure Casting, product pp. 1-8, Cosma International 2014.
GF Casting Solutions, Battery Housing, product pp. 1-2, Apr. 6, 2021.

* cited by examiner

*Primary Examiner* — Jason D Shanske
*Assistant Examiner* — James J Triggs
(74) *Attorney, Agent, or Firm* — Burris Law, PLLC

(57) ABSTRACT

A battery box for an electric vehicle includes an Al casting that extends between and joins to a BIW or chassis rails of the electric vehicle. The Al casting includes a bottom wall, a side wall with a pair of rails that are securely attached to the BIW or chassis rails of the vehicle, and a plurality of cross members. The bottom wall, the side wall, and the plurality of cross members define a structural enclosure with a plurality of battery compartments and at least one crush zone, and the structural enclosure is load bearing member of the electric vehicle.

20 Claims, 6 Drawing Sheets

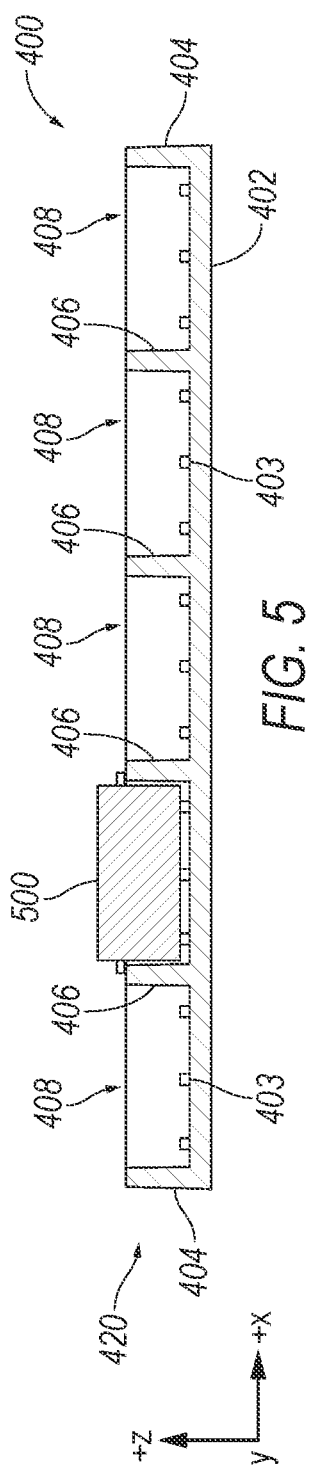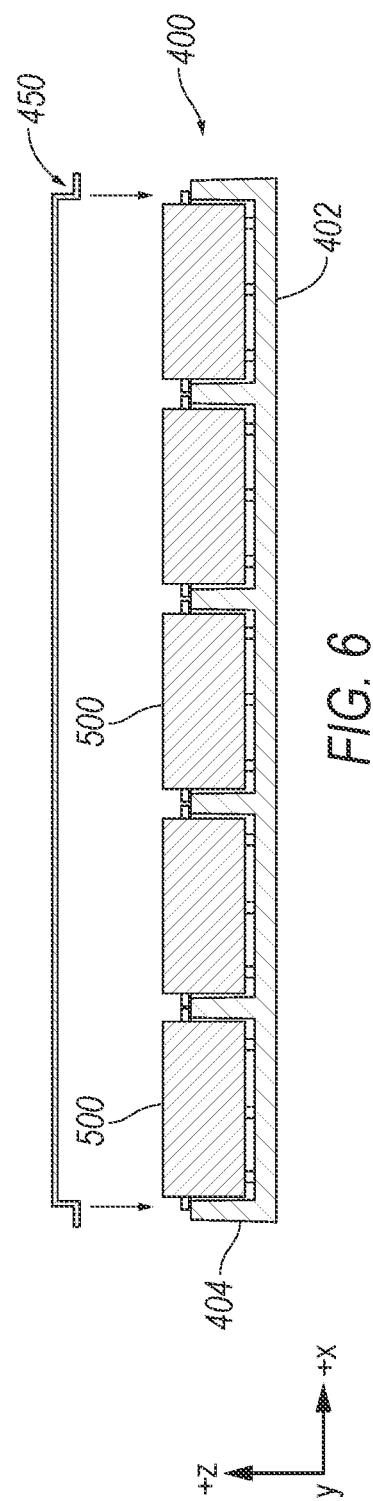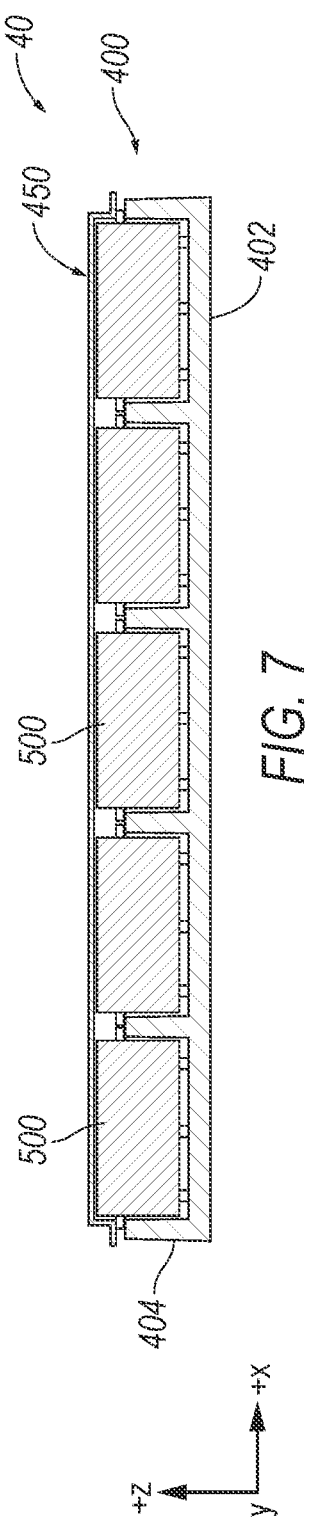

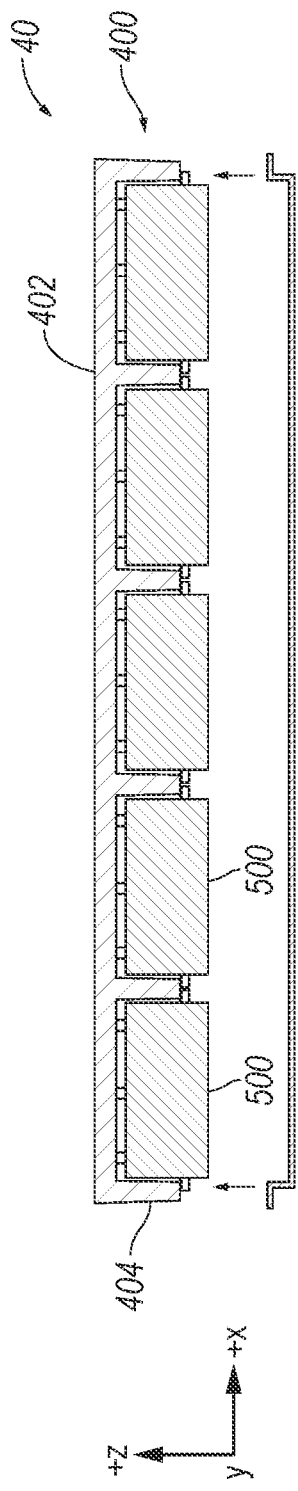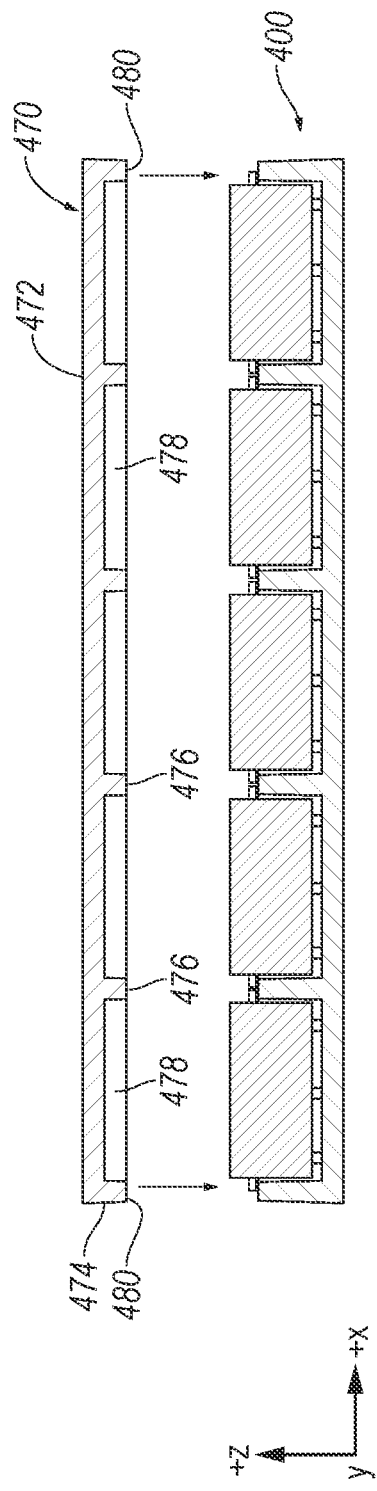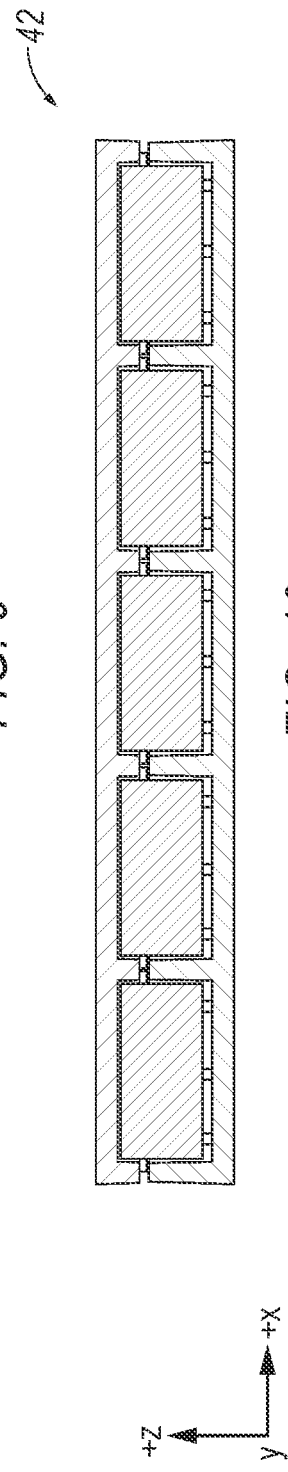

LIGHTWEIGHT BATTERY BOX FOR ELECTRIC VEHICLES

FIELD

The present disclosure relates to light weighting of vehicles and particularly to light weighting of electric vehicles.

BACKGROUND

The statements in this section merely provide background information related to the present disclosure and may not constitute prior art.

Electric vehicles include all-electric vehicles (AEVs) that are powered by one or more electric motors and do not consume petroleum-based fuel and plug-in hybrid electric vehicles (PHEVs) that are powered by one or more electric motors and an internal combustion engine. And AEVs include battery electric vehicles (BEVs) and fuel cell electric vehicles (FCEVs) that use a plurality of battery modules and a plurality of fuel cell modules, respectively, to store and provide electric energy to the one or more electric motors. The battery modules are stored or contained in a "battery box" that includes a plurality of battery module compartments, impact supports, a cooling system, and attachment rails to mount the battery box to a body-in-white (BIW) or chassis rails of an electric vehicle. However, the battery box requires the assembly of a number of different steel or aluminum alloy panels, brackets, and rails, and also adds weight to the AEV.

The present disclosure addresses the issues of assembling a battery box, among other issues related to battery boxes.

SUMMARY

This section provides a general summary of the disclosure and is not a comprehensive disclosure of its full scope or all of its features.

In one form of the present disclosure, a battery box for a vehicle includes a first portion formed from an aluminum (Al) casting with a bottom wall, a side wall, and a plurality of cross members defining a plurality of battery compartments and a structural enclosure configured to extend between and mechanically couple to at least one of a body-in-white (BIW) and chassis rails of a vehicle.

In some variations, the side wall includes a pair of rails configured to be securely attached to the BIW or chassis rails of the vehicle. In such variations, the pair of rails can extend along an outer surface of the side wall.

In at least one variation, the side wall includes a pair of external longitudinal side walls and a pair of external transverse side walls, and the pair of external longitudinal side walls each include a rail extending along an outer surface and configured to be coupled to the BIW or chassis rails of the vehicle.

In some variations, the structural enclosure and the rails define at least one crush zone.

In at least one variation, the bottom wall includes a plurality of cooling fins.

In some variations, the Al casting has a chemical composition, in weight percent, comprising 6-8.5% Si, up to 0.25% Fe, 0.5-0.9% Mn, 0.2-0.3% Mg, up to 0.16% Ti, 0.015-0.025% Sr, up to 0.001% Cu, unavoidable impurities up to 0.05% each, and the remainder being Al. In at least one variation, the structural enclosure is free of a solution heat treatment.

In some variations, a length of the structural enclosure is between about 2.0 m to about 3.0 m and a width of the structural enclosure is between about 1.5 m to about 2.0 m. In at least one variation, the side wall has a thickness between about 25 mm and about 65 mm.

In some variations, the Al casting is a lower portion of a battery box for the vehicle. And in such variations, the battery box can further include an upper portion configured to couple to the lower portion.

In other variations, the Al casting is an upper portion of a battery box for the vehicle. And in such variations, the battery box can further include a lower portion configured to couple to the upper portion.

In another form of the present disclosure, a battery box for a vehicle includes a first portion comprising an Al casting configured to extend between and join to at least one of a BIW and chassis rails of a vehicle. The first portion includes a bottom wall, a side wall with a pair of rails configured to be securely attached to the BIW or chassis rails of the vehicle, and a plurality of cross members. The bottom wall, the side wall, and the plurality of cross members define a structural enclosure with a plurality of battery compartments and at least one crush zone.

In some variations, the side wall comprises a pair of longitudinal side walls with a respective rail extending along an outer surface of a respective longitudinal side wall and configured to be coupled to the BIW or chassis rails of the vehicle.

In at least one variation, the Al casting has a chemical composition, in weight percent, comprising 6-8.5% Si, up to 0.25% Fe, 0.5-0.9% Mn, 0.2-0.3% Mg, up to 0.16% Ti, 0.015-0.025% Sr, up to 0.001% Cu, unavoidable impurities up to 0.05% each, and the remainder being Al.

In still another variation of the present disclosure, a battery box for a vehicle includes a first portion comprising an Al casting with a chemical composition, in weight percent, comprising 6-8.5% Si, up to 0.25% Fe, 0.5-0.9% Mn, 0.2-0.3% Mg, up to 0.16% Ti, 0.015-0.025% Sr, up to 0.001% Cu, unavoidable impurities up to 0.05% each, and the remainder being Al. The first portion includes a bottom wall with cooling fins, a side wall with a pair of rails configured to be securely attached to a BIW or chassis rails of a vehicle, and a plurality of cross members. The bottom wall, the side wall, and the plurality of cross members define a structural enclosure with a plurality of battery compartments and at least one crush zone.

In some variations, a length of the structural enclosure is between about 2.0 m to about 3.0 m, a width of the structural enclosure is between about 1.5 m to about 2.0 m, and the side wall has a thickness between about 25 mm and about 65 mm.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 5 is a cross sectional view of section 5-5 in FIG. 4.

FIG. 6 is a cross sectional view of section 5-5 in FIG. 4 with a plurality of battery modules disposed or mounted within a plurality of battery compartments of the first portion of the battery box and a second portion to be attached to the first portion according to one form of the present disclosure;

FIG. 7 shows the cross sectional view of FIG. 6 with the second portion attached to or installed on the first portion of the battery box;

FIG. 8 shows the cross sectional view of FIG. 6 with the first portion configured as an upper portion of the battery box and the second portion configured as a lower portion;

Figure 4:
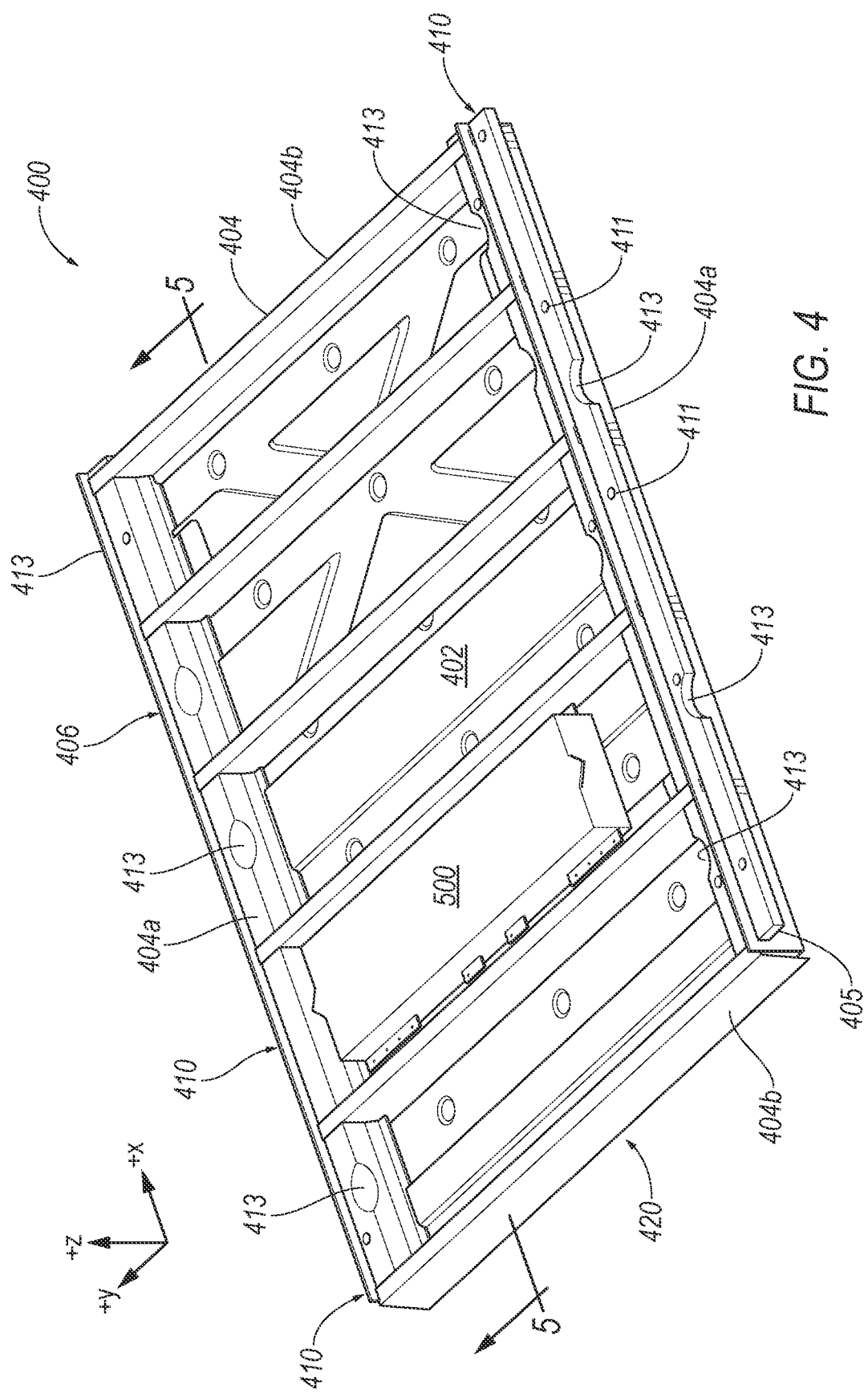
FIG. 4 is a perspective view of a first portion of a battery box according to the teachings of the present disclosure.

FIG. 9 is a cross sectional view of section 5-5 in FIG. 4 with a plurality of battery modules disposed or mounted within a plurality of battery compartments of the first portion of the battery box and a second portion to be attached to the first portion according to another form of the present disclosure; and FIG. 10 shows the cross sectional view of FIG. 9 with the second portion attached to or installed on the first portion of the battery box.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
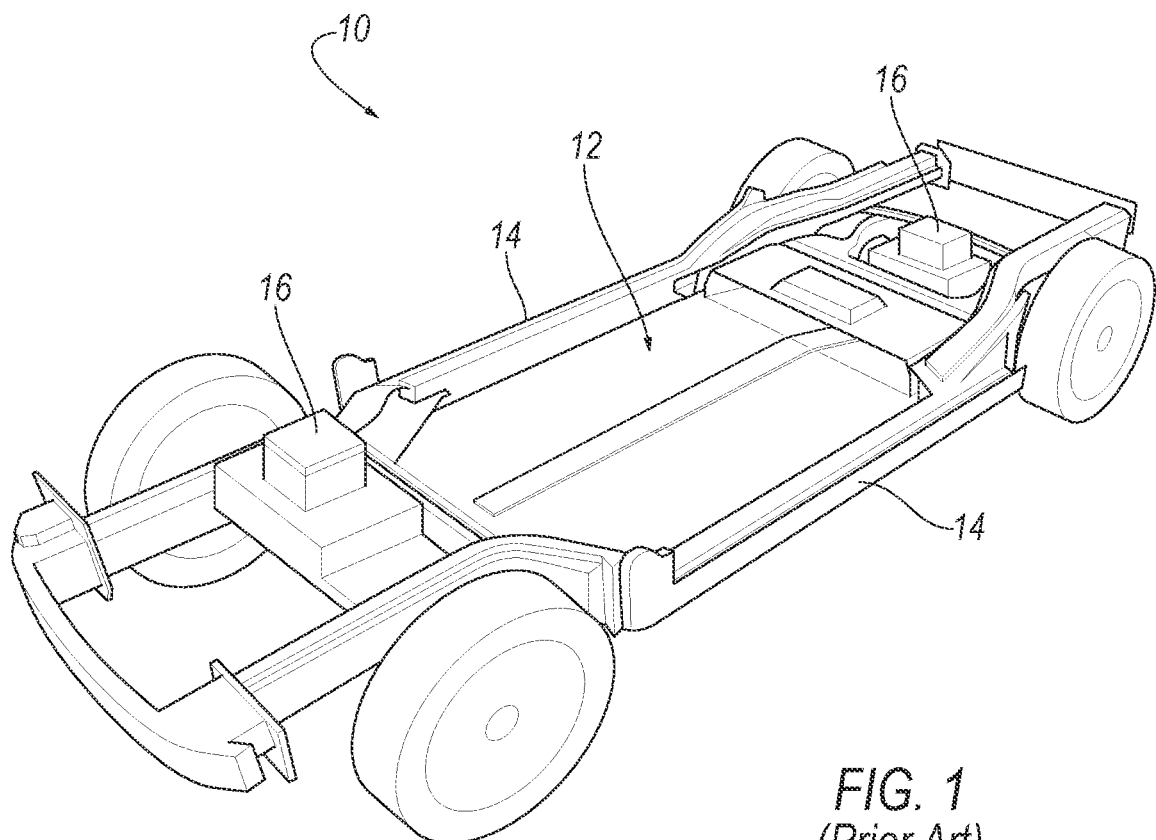
FIG. 1 is a photograph of a battery box mounted to a BIW.

Referring to FIG. 1, a photograph of a BIW 10 with a battery box 12 is shown. The battery box 12 extends between and along rails 14 of the BIW 10 and is mechanically coupled to the BIW 10 via the rails 14. And though not shown in the figure, it should be understood that a plurality of battery modules that store and provide electric energy to at least one electric motor 16 are disposed within the battery box 12. As used herein, the term "rail" or "rails" refers to for aft structural member that assists with energy absorption either by impact, durability or shock of the AEV.

Figure 2:
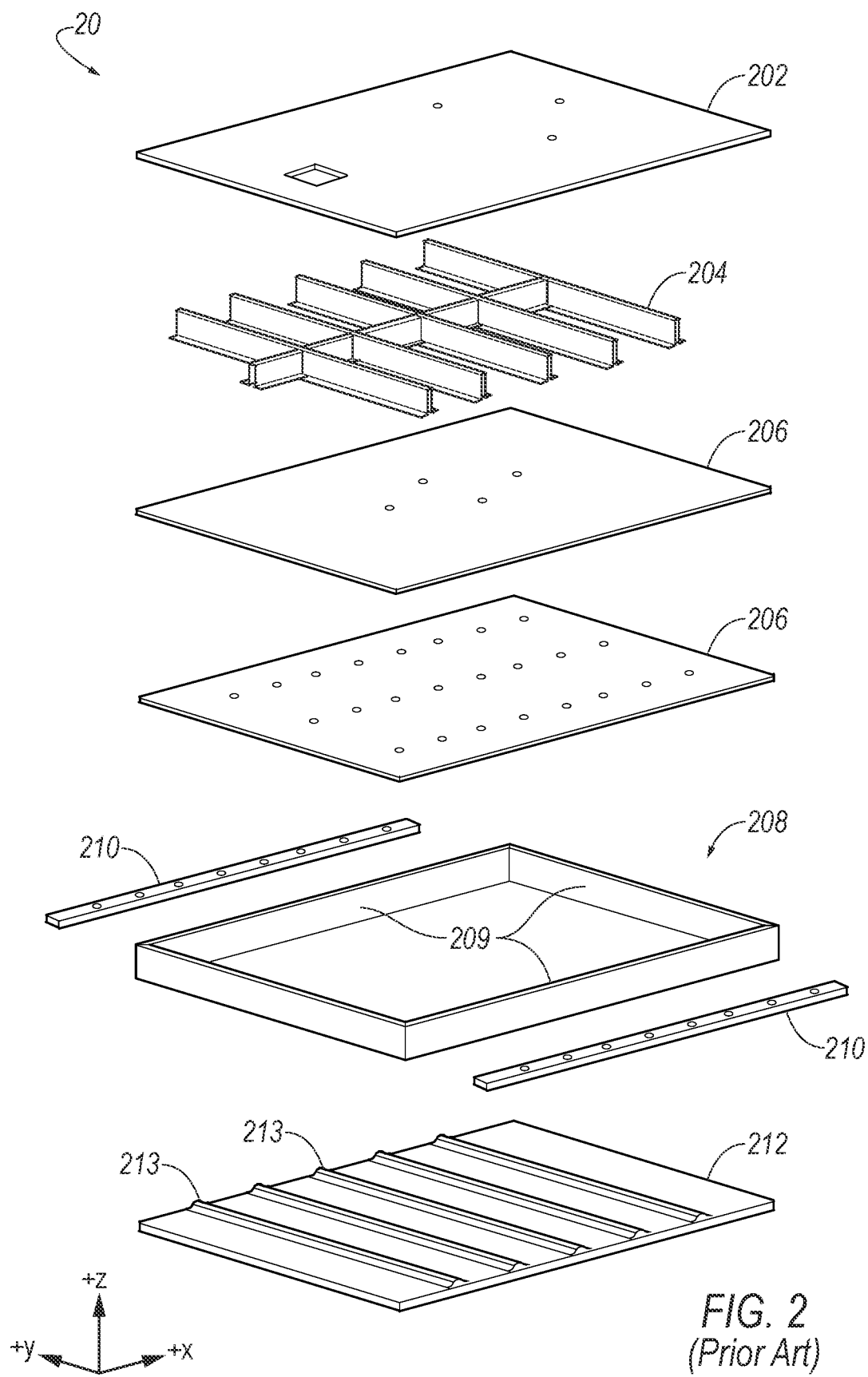
FIG. 2 is an exploded view of a conventional battery box.

Referring now to FIG. 2, an exploded view of a conventional battery box 20 is shown. The battery box 20 includes a plurality of battery box components such as a top cover panel 202, a plurality of cross members 204, cooling system panels 206, and a frame 208 with a plurality of side walls 209. In addition, the battery box 20 can include brackets and/or rails 210 for mounting to the frame 208 and to a BIW (not shown) and a lower shield panel 212 with transverse (y direction) supports 113. In some variations one or more of the plurality of battery box components are formed from sheet metal, e.g., steel sheet metal or aluminum alloy sheet metal.

It should be understood that construction of the battery box 20 includes one more operations such as stamping to form one or more of the battery box components, hot stamping to form one or more of the battery box components, quenching of one or more of the hot stamped battery box components, bending one or more sheet metal pieces to form battery box components, and welding two or more of the battery box components together, among others. For example, in order to form the frame 208, at least two of the side walls 209 are welded together. And to join and seal the lower shield panel 212 to the frame 208, the lower shield panel 212 is welded to the frame 208 with or without additional sealant applied along the welds and corners between the two components. It should also be understood that each assembly operation required to construct the battery box 20 adds cost and possible dimensional variation to the assembly of the battery box 20. Furthermore, the battery box 20 does not have or include external load bearing features to translate or absorb impact loads of an AEV.

Figure 3:
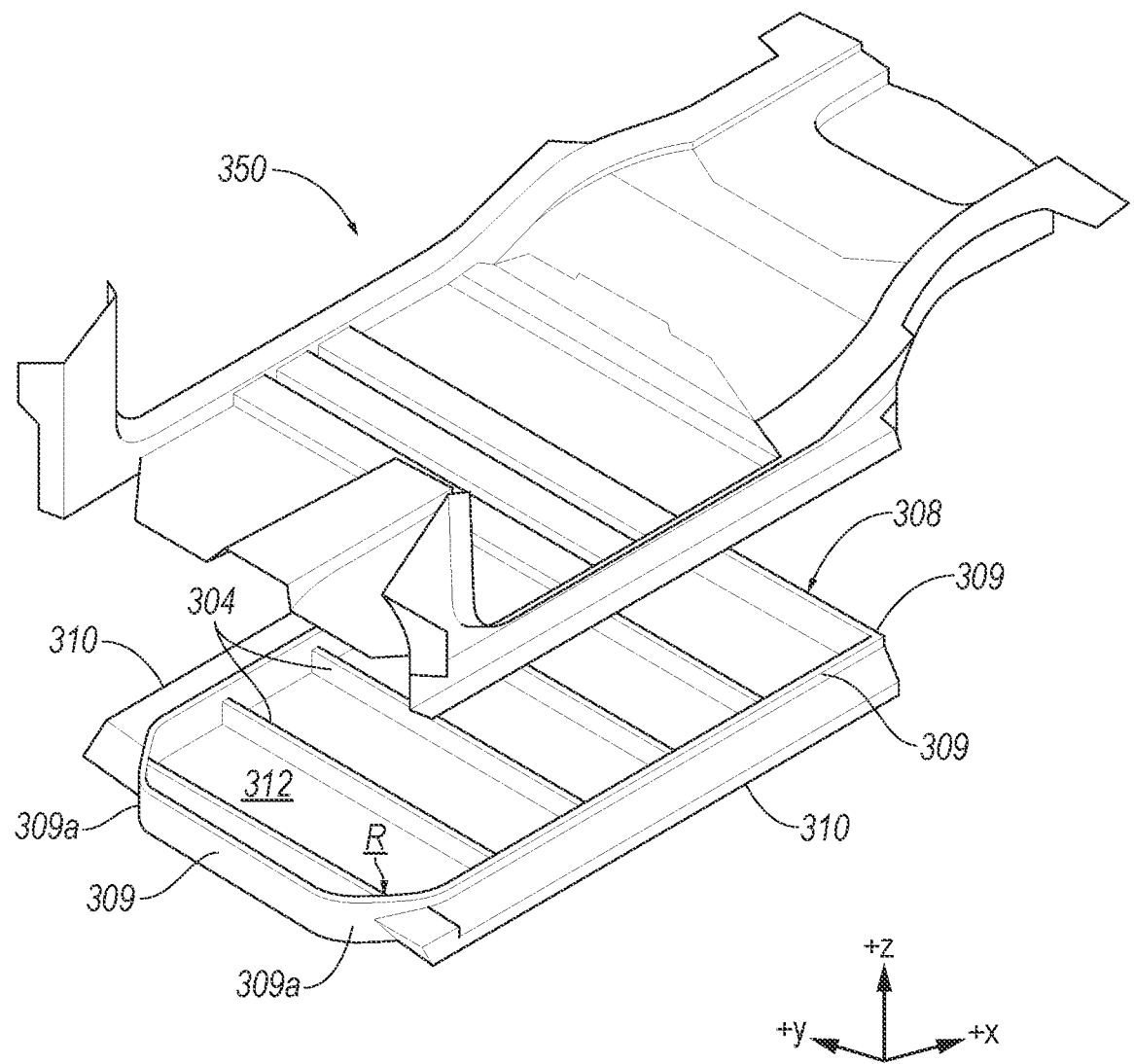
FIG. 3 is an exploded view of another conventional battery box and a chassis to which the battery box is to be mounted.

Referring now to FIG. 3, a perspective view of another conventional battery box 30 configured to mount to a BIW 350 is shown. And similar to the battery box 20, the battery box 30 includes a top cover panel (not shown), a plurality of cross members 304, cooling system panels (not shown), a frame 308 with a plurality of side walls 309, a pair of rails 310 for mounting to the BIW 350, and a lower shield panel 312. In some variations one or more of the plurality of battery box components are formed from sheet metal, e.g., steel sheet metal or aluminum alloy sheet metal. In addition, and in order to reduce the number of operations (e.g., welds) to form the battery box 30, at least two corners 309a of the frame 308 are formed via plastic deformation of a single side wall 309 component (e.g., bending, draw bending or stamping) such that welding of the corners 309a is not required. However, forming the corners 309a in this manner requires the corners 309a to have a predefined radius 'R' that reduces the storage capacity of the battery box 30. That is, the radius R of the corners 309a reduces the volume of the battery box 30 and thereby reduces the volume of battery modules that can be held and stored in the battery box 30 (storage capacity) compared to the battery box 20 with "sharp" corners. Also, in some variations, the pair of rails 310 are formed as extruded rails for improved strength with factors such as alloy selection, billet heating, die design, die lubrication, and extrusion process parameters affecting the microstructure and cost of such extruded rails.

Referring now to FIGS. 4 and 5, a first portion 400 of a battery box 40 (FIG. 7) according to the teachings of the present disclosure is shown. In some variations the first portion 400 and is a lower half or lower compartment of the battery box 40, while in other variations the first portion 400 is an upper half or upper compartment of the battery box 40. And in contrast to the battery boxes 12, 20, and 30, the first portion 400 is formed from a single lightweight casting such that assembly of a plurality of components to form the first portion 400 is not necessary. Also, and in contrast to the battery box 30, the first portion does not include corners with a relatively large radius (e.g., compared to corners with generally a 90° angle) such that the storage capacity of the battery box 40 is enhanced or increased compared to the battery box 20.

The first portion 400 includes a bottom wall 402, a side wall 404, a plurality of cross members 406 that form a plurality of battery compartments 408 to hold and store a plurality of battery modules 500, and a pair of rails 410 for mounting or securely attaching the first portion 400 to a BIW (not shown) or chassis rails of an AEV. Also, the bottom wall 402, the side wall 404, and the plurality of cross members 406 define a load bearing structural enclosure 420 (also referred to herein simply as 'structural enclosure") that extends between and is configured to couple to a BIW or chassis rails of an AEV. For example, in some variations, the pair of rails include apertures 411 configured for bolts (not shown) that can be and are used to bolt the rails 410 to the BIW or chassis rails of an AEV. Accordingly, the structural enclosure 420 provides structural support to the BIW or chassis of an AEV.

In some variations, the pair of rails 410 are cast integrally with the side wall 404, and as shown in FIG. 4, in at least one variation the pair of rails 410 extend along an outer surface 405 of the side wall 404. For example, the side wall 404 can include a pair of external longitudinal side walls 404a and a pair of external transverse side walls 404b, and each of the longitudinal side walls 404a include one of the pair of rails 410 extending along the outer surface 405. In at least one variation, the pair of rails 410, the pair of external longitudinal side walls 404a, and/or the a pair of transverse side walls 404b provide one or more crush zones 413. As used herein, the phrase "crush zone" refers to an area or section of the vehicle that are designed and structured to deform and 'crumple" in a collision such that a portion of energy of an impact is absorbed and prevented from being transmitted to an occupant of the vehicle.

In some variations, the bottom wall 402 includes one or more cooling fins 403 that provide a distance (e.g., a "cooling fluid gap") between a bottom wall 402 and an outer surface of the battery modules 500, e.g., between an upper (+z direction) of the bottom wall 402 and a lower (−z direction) of a battery module 500 disposed within a battery compartment 408.

Still referring to FIGS. 4 and 5, the first portion 400 is configured to hold and store a plurality of battery modules 500 via the battery compartments 408 and to be included as part of the frame structure of an AEV. Accordingly, the first portion 400 extends along a substantial length (x direction) and substantial width (y direction) of a BIW or chassis of an AEV. For example, in some variations the first portion 400 extends at least 80%, and in at least one variation at least 90% of the width of the BIW or chassis. And in some variations the first portion 400 extends at least 60%, and in at least one variation at least 70% of the length between the front and rear drive train axles of an AEV. Accordingly, in some variations, the first portion 400 has a length between about 2000 millimeters (mm) and 3000 mm, and a width between about 1400 mm and about 2500 mm. For example, in at least one variation, the first portion 400 has a length between about 2200 mm and about 2600 mm, and a width between about 1600 mm and about 2000 mm. In addition, in some variations the side wall 406 has a height (z direction) between about 140 mm and about 220 mm, and/or a thickness between about 25 mm and about 65 mm, for example, a height between about 160 mm and about 200 mm, and/or a thickness between about 35 mm and about 55 mm.

Referring to FIGS. 6 and 7, in some variations the battery box 40 includes a second portion 450. In some variations where the first portion 400 is a lower (−z direction) half or lower compartment of the battery box 40 and the second portion 450 is an upper (+z direction) half or upper compartment of the battery box 40 such that a water tight battery enclosure is provided. In other variations the first portion 400 is an upper half or upper compartment of the battery box 40 and the second portion 450 is a lower half or lower compartment of the battery box 40 as shown in FIG. 8 such that a water tight battery enclosure is provided. As used herein, the phrase "water tight" refers to a sealed, fastened, and/or fitted enclosure that does not allow water to enter or exit.

In some variations, the second portion 450 is formed from a sheet metal panel, e.g., a steel sheet metal panel or an aluminum alloy sheet metal panel. Accordingly, the present disclosure provides enclosed battery enclosures for AEVs that are formed from a combination of a single cast first portion that has a plurality of battery compartments and a second portion formed from one or more sheet metal components.

Referring now to FIGS. 9 and 10, in some variations a battery box 42 includes a second portion 470 formed from another single casting. The second portion 470 includes an upper wall 472 and a side wall 474. In some variations, the second portion 470 includes a plurality of cross members 476 such that compartments 478 are defined by the upper wall 472, the side wall 474, and cross members 476. In at least one variation a pair of attachment members 480 for mounting the second portion 470 to the first portion 400 is provided.

It should be understood that while FIGS. 9 and 10 show the first portion 400 as a lower half or lower compartment of the battery box 40 and the second portion 470 as an upper half or upper compartment of the battery box 40, in some variations the first the first portion 400 is an upper half or upper compartment of the battery box 40 and the second portion 470 as a lower half or lower compartment of the battery box 40.

It should also be understood that the battery box 40, once assembled, provides a sealed environment that protects battery modules 500 held and stored within the battery compartments 408 from undesired moisture, road salt, dirt, and debris.

In some variations, the first portion 400 and/or the second portion 470 is a light weight casting, e.g., an aluminum alloy casting or a magnesium alloy casting. In at least one variation the first portion 400 and/or the second portion 470 is a non-solution heat treated aluminum alloy casting. That is, the first portion 400 and/or the second portion 470 does not require and is not subjected to a solution heat treatment after the first portion 400 and/or the second portion 470 is cast. As used herein the phrase "solution heat treatment" refers heating of an alloy to a temperature at which one or more constituents of the alloy enter into solid solution followed by cooling at a cooling rate sufficient to prevent the dissolved one or more constituents from precipitating in the alloy. In some variations, the aluminum alloy casting has a chemical composition, in weight % (wt. %), of 6-8.5% Si, up to 0.25% Fe, 0.5-0.9% Mn, 0.2-0.3% Mg, up to 0.16% Ti, 0.015-0.025% Sr, up to 0.001% Cu, unavoidable impurities up to 0.05% each, and the remainder being Al.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A battery box for a vehicle, the battery box comprising:
a first portion formed from a single aluminum (Al) casting, the first portion comprising a bottom wall, a side wall, and a plurality of cross members, the bottom wall, the side wall, and the plurality of cross members defining a plurality of battery compartments and a structural enclosure, the structural enclosure configured to extend between and mechanically couple to chassis rails of the vehicle.

2. The battery box according to claim 1, wherein the side wall comprises a pair of rails configured to be securely attached to the chassis rails of the vehicle.

3. The battery box according to claim 2, wherein the pair of rails extend along an outer surface of the side wall.

4. The battery box according to claim 1, wherein the side wall comprises a pair of external longitudinal side walls and a pair of external transverse side walls.

5. The battery box according to claim 4, wherein the pair of external longitudinal side walls each comprise a rail extending along an outer surface and configured to be coupled to the chassis rails of the vehicle.

6. The battery box according to claim 5, wherein the structural enclosure and the rails define at least one crush zone.

7. The battery box according to claim 1, wherein the bottom wall further comprises a plurality of cooling fins.

8. The battery box according to claim 1, wherein the Al casting has a chemical composition, in weight percent, comprising 6-8.5% Si, up to 0.25% Fe, 0.5-0.9% Mn, 0.2-0.3% Mg, up to 0.16% Ti, 0.015-0.025% Sr, up to 0.001% Cu, unavoidable impurities up to 0.05% each, and the remainder being Al.

9. The battery box according to claim 8, wherein the structural enclosure is free of a solution heat treatment.

10. The battery box according to claim 1, wherein a length of the structural enclosure is between 2.0 m to 3.0 m and a width of the structural enclosure is between 1.5 m to 2.0 m.

11. The battery box according to claim 10, wherein the side wall has a thickness between 25 mm and 65 mm.

12. The battery box according to claim 1, wherein the first portion is a lower portion of the battery box for the vehicle.

13. The battery box according to claim 12 further comprising an upper portion configured to couple to the lower portion.

14. The battery box according to claim 1, wherein the first portion is an upper portion of the battery box for the vehicle.

15. The battery box according to claim 14 further comprising a lower portion configured to couple to the upper portion.

16. A battery box for a vehicle, the battery box comprising:
a first portion formed from a single aluminum (Al) casting, the first portion configured to extend between and join to chassis rails of the vehicle, the first portion comprising a bottom wall, a side wall with a pair of rails configured to be securely attached to the chassis rails of the vehicle, and a plurality of cross members, wherein the bottom wall, the side wall, and the plurality of cross members define a structural enclosure with a plurality of battery compartments and at least one crush zone.

17. The battery box according to claim 16, wherein the side wall comprises a pair of longitudinal side walls with a respective rail extending along an outer surface of a respective longitudinal side wall and configured to be coupled to the chassis rails of the vehicle.

18. The battery box according to claim 17, wherein the Al casting has a chemical composition, in weight percent, comprising 6-8.5% Si, up to 0.25% Fe, 0.5-0.9% Mn, 0.2-0.3% Mg, up to 0.16% Ti, 0.015-0.025% Sr, up to 0.001% Cu, unavoidable impurities up to 0.05% each, and the remainder being Al.

19. A battery box for a vehicle, the battery box comprising:
a first portion formed from a single aluminum (Al) casting, the aluminum (Al) casting having a chemical composition, in weight percent, comprising 6-8.5% Si, up to 0.25% Fe, 0.5-0.9% Mn, 0.2-0.3% Mg, up to 0.16% Ti, 0.015-0.025% Sr, up to 0.001% Cu, unavoidable impurities up to 0.05% each, and the remainder being Al, the first portion configured to extend between and join to chassis rails of the vehicle and comprising a bottom wall with cooling fins, a side wall with a pair of rails configured to be securely attached to chassis rails of the vehicle, and a plurality of cross members, wherein the bottom wall, the side wall, and the plurality of cross members define a structural enclosure with a plurality of battery compartments and at least one crush zone.

20. The battery box according to claim 19, wherein a length of the structural enclosure is between about 2.0 m to about 3.0 m, a width of the structural enclosure is between about 1.5 m to about 2.0 m, and the side wall has a thickness between about 30 mm and about 60 mm.

* * * * *